United States Patent
Christie

(10) Patent No.: US 10,298,999 B2
(45) Date of Patent: May 21, 2019

(54) AUTOMATED COMPLIANCE MANAGEMENT

(71) Applicant: PIKSEL, INC., Wilmington, DE (US)

(72) Inventor: Mark Christie, London (GB)

(73) Assignee: PIKSEL, INC., Wilmington, DE (US)

( * ) Notice: Subject to any disclaimer, the term of this patent is extended or adjusted under 35 U.S.C. 154(b) by 0 days.

(21) Appl. No.: 15/509,954

(22) PCT Filed: Sep. 9, 2015

(86) PCT No.: PCT/EP2015/070640
§ 371 (c)(1),
(2) Date: Mar. 9, 2017

(87) PCT Pub. No.: WO2016/038103
PCT Pub. Date: Mar. 17, 2016

(65) Prior Publication Data
US 2017/0245005 A1    Aug. 24, 2017

(30) Foreign Application Priority Data

Sep. 9, 2014  (GB) .................................. 1415917.2

(51) Int. Cl.
*H04N 21/454*    (2011.01)
*H04N 21/488*    (2011.01)
(Continued)

(52) U.S. Cl.
CPC ...... *H04N 21/44008* (2013.01); *H04H 60/04* (2013.01); *H04H 60/07* (2013.01);
(Continued)

(58) Field of Classification Search
None
See application file for complete search history.

(56) References Cited

U.S. PATENT DOCUMENTS 9,071,871 B2 *  6/2015  Porter ................ H04N 21/4542
9,679,606 B2 *  6/2017  Cary .................... G11B 27/031
(Continued)

FOREIGN PATENT DOCUMENTS

WO   WO 2009/053685 A1   4/2009

OTHER PUBLICATIONS

International Search Report and Written Opinion, dated Nov. 13, 2015, European Patent Office.

*Primary Examiner* — James R Sheleheda
(74) *Attorney, Agent, or Firm* — Holzer Patel Drennan

(57) ABSTRACT

There is disclosed a computer system for analysing content, comprising: a detection module connected to receive at least one piece of digital content, the detection module being operable to access a set of compliance rules and compare the received at least one piece of digital content with the set of compliance rules, the detection module further being configured to generate an alert if the result of the analysis indicates a breach of at least one of the rules; a moderator module connected to receive the alert, the moderator module configured to enable output to a moderator based only on the piece of digital content which caused the alert to be generated, whereby the moderator can assess a modification to be made to the piece of content which caused the alert to be generated.

20 Claims, 4 Drawing Sheets

(51) Int. Cl.
　　*H04N 21/44*　　　(2011.01)
　　*H04H 60/04*　　　(2008.01)
　　*H04H 60/48*　　　(2008.01)
　　*H04H 60/58*　　　(2008.01)
　　*H04H 60/59*　　　(2008.01)
　　*H04H 60/07*　　　(2008.01)
　　*H04N 21/442*　　　(2011.01)
　　*H04N 21/4627*　　　(2011.01)
　　*H04N 21/472*　　　(2011.01)

(52) U.S. Cl.
　　CPC ............ *H04H 60/48* (2013.01); *H04H 60/58* (2013.01); *H04H 60/59* (2013.01); *H04N 21/44222* (2013.01); *H04N 21/454* (2013.01); *H04N 21/4542* (2013.01); *H04N 21/4627* (2013.01); *H04N 21/47202* (2013.01); *H04N 21/4882* (2013.01)

(56) References Cited

U.S. PATENT DOCUMENTS 9,723,044 B1 * 8/2017 Kosslyn ............ G06F 17/30041
2007/0083423 A1 * 4/2007 Delbridge ............ G06Q 10/10
　　　　　　　　　　　　　　　　　　705/12
2008/0222283 A1 * 9/2008 Ertugrul ................ G06Q 30/02
　　　　　　　　　　　　　　　　　　709/224
2009/0249387 A1　10/2009 Magdy et al.
2011/0126223 A1　5/2011 Shahraray et al.
2011/0283311 A1 * 11/2011 Luong .................. H04N 21/414
　　　　　　　　　　　　　　　　　　725/28
2014/0068437 A1 * 3/2014 Dedapper ............ G06Q 50/01
　　　　　　　　　　　　　　　　　　715/719
2014/0164938 A1 * 6/2014 Petterson ............ G06F 3/0482
　　　　　　　　　　　　　　　　　　715/739
2014/0196073 A1 * 7/2014 Riggs ............... H04N 21/25875
　　　　　　　　　　　　　　　　　　725/27
2015/0229689 A1 * 8/2015 Jarman .................. H04N 7/163
　　　　　　　　　　　　　　　　　　709/219
2017/0223133 A1 * 8/2017 Joshi ..................... H04L 67/306
2017/0245005 A1 * 8/2017 Christie ................ H04H 60/04
2018/0220165 A1 * 8/2018 Shaw .................... H04N 21/235
2018/0351895 A1 * 12/2018 Rathod .................. H04L 51/10

* cited by examiner

FIG. 2

Programme Title: [ ]  UID: [ ]
Working Title: [ ]  Version suffix: [ ]
Episode/Sub Title: [ ]

| Time Codes/Notes: | Compliance Questions: | YES | NO |
|---|---|---|---|
| | 1-LEGAL ISSUES | | |
| | STRONG LANGUAGE/GESTURE | | |
| | 2-Strong, most offensive | | |
| | 3-Any other which may offend | | |
| | SEX | | |
| | 4-Sexual content | | |
| | 5-Sexual innuendo/reference | | |
| | 6-Nudity | | |
| | VIOLENCE | | |
| | 7-Real life | | |
| | 8-Fictional | | |
| | 9-Involving children | | |
| | 10-Involving violence | | |
| | IMITATIVE BEHAVIOUR | | |
| | 11-Drug/solvent abuse | | |
| | 12-Suicide/self harm/hanging/ eating disorders | | |
| | 13-Other potentially dangerous behaviour | | |
| | 14-Use of alcohol/smoking | | |
| | PORTAYAL | | |
| | 15-Disabilities/Religious/Minorities | | |
| | 16-Cultural Sensitivities | | |
| | DISTURBING CONTENT | | |
| | 17-Disturbing images/Sounds | | |
| | 18-Disasters/accidents/kidnapping/ terrorist acts | | |
| | 19-Exorcism/occult/paranormal/horror | | |
| | IMPARTIALITY AND DIVERSITY OF OPINION | | |
| | 20-Personal view/authored | | |
| | 21-Major controversial subjects/issues | | |
| | 22-Does it require additional programming? | | |

| ACCURACY | |
|---|---|
| 23-Reconstructions | |
| 24-Anonymity issues | |
| FAIRNESS AND ACCURACY IN DRAMA | |
| 25-Portrayal of real people in drama | |
| PRIVACY | |
| 26-Secret recording/webcam/CCTV | |
| 27-Footage of suffering and distress | |
| 28-Door stepping | |
| CRIME AND ANTISOCIAL BEHAVIOUR | |
| 29-Interviews with criminals | |
| 30-Demonstration of illegal activity | |
| EDITORIAL INTEGRITY AND INDEPENDENCE | |
| 31-Commercial, sponsor or brand references | |
| 32-Branded products featured | |
| 33-Conflicts of interest: Presenters/ guest production team | |
| POLITICS | |
| 34-Opinion polls/surveyd | |
| 35-Interview/appearance of party leaders | |
| 36-If yes to 34 or 35, referred to chief Political Advisor? | |
| OTHER ISSUES AFFECTING TRANSMISSION | |
| 37-Public figures-as contributors | |
| 38-Public figures - reference to | |
| 39-Sensitive content issues | |
| 40-Any restriction on re-use | |
| 41-Flashing lights/strobing affects which have failed TX review | |
| INTERACTIVITY | |
| 42-Competitions | |
| 43-Audience voting | |
| 44-Premium Rate Telephony | |
| 45-Non Premium Rate Telephony | |

Does programme include:

Telephone number ☐    Website/postal address ☐    Related interactive site ☐

*FIG. 2 (Cont'd)*

AUTOMATED COMPLIANCE MANAGEMENT

BACKGROUND OF THE INVENTION

Field of the Invention

The present invention relates to automated compliance management.

Description of the Related Art

There are strict compliance rules in place for broadcasting content to end customers. Compliance rule sets vary by country. Compliance rules sets also influence parental guidance ratings. For example, excessive violence in a TV episode may warrant an 18 certificate rating. In the traditional broadcast world, this may influence the time a programme is aired (for example after a 9:00 pm watershed). In the OTT VOD (over the top video on demand) world, this would inform parental guidance controls to ensure that for example an 8 year old cannot watch an 18 certificate rated piece of content without parental consent.

The traditional approach for long form content in the pre-transmission workflow is for a compliance editor to view each piece of content and then create and enter compliance metadata at specific time codes in the video asset that is categorised against a set of compliance rules.

The aggregated metadata can then be used in order to determine any compliance issues that may be faced for a programme in terms of its guidance rating and time of broadcast.

For large content volumes this requires multiple compliance moderators and can be cost prohibitive.

SUMMARY OF INVENTION

The invention provides a computer system for analysing content, comprising: a detection module connected to receive at least one piece of digital content, the detection module being operable to access a set of compliance rules and compare the received at least one piece of digital content with the set of compliance rules, the detection module further being configured to generate an alert if the result of the analysis indicates a breach of at least one of the rules; a moderator module connected to receive the alert, the moderator module configured to enable output to a moderator based only on the piece of digital content which caused the alert to be generated, whereby the moderator can assess a modification to be made to the piece of content which caused the alert to be generated.

The invention also provides a method for analysing content, comprising: receiving at least one piece of digital content, accessing a set of compliance rules, comparing the received at least one piece of digital content with the accessed compliance rules; generating an alert if the result of the comparing step indicates a breach of at least one of the rules; outputting to a moderator, responsive to the alert, an identification associated with only the piece of digital content which caused the alert to be generated, selecting for assessment the piece of digital content which caused the alert to be generated.

An arrangement provides a computer system for analysing content, comprising: a detection module configured to receive pieces of content as a digital stream and operable to access a set of compliance rules, to analyse the pieces of content and compare a result of the analysis with the set of rules, and to generate an alert if the result indicates a breach of at least one of the rules; a moderator module connected to receive the alert and configured to enable output to a human moderator of only any pieces of content which caused the alert to be generated whereby the human moderator can select to assess only these pieces of content which caused an alert to be generated.

The invention is particularly useful in the context of VOD assets, where there may be large number of clips/assets that need to be moderated and for which a purely manual approach would be prohibitively time consuming.

According to the following described embodiments of the invention, automated approaches are implemented that analyse content and provide alerts of potentially dubious content to a moderator. Using an automated approach reduces the number of clips that a content moderator needs to review, making the process significantly more efficient. The described embodiments of the present invention utilise cognitive analysis of video streams, which is a technology which is currently available for analysing video streams in the security sector. Instead of a moderator having to manually create and enter compliance metadata at specific time codes in an asset, the cognitive analysis allows for a comparison between the content of the video stream and the compliance rules to be automatically executed, and an alert as to possibly suspect content to be raised.

This is particularly advantageous for user generated content. For user generated content, challenges as to compliance exist as described above in the broadcast world. Although the majority of this type of content is more short form, there is a risk that uploaded content from users may contain inappropriate visual content (i.e. pornography) or audio content (i.e. swearing). The traditional approach as described above would be to use a manual moderator resource to check all uploaded user generated content to a service to view the content in real-time and then either approve or reject the content. The automated approaches discussed herein represent a significant improvement in terms of moderator time and process efficiency, while nevertheless ensuring that compliance is met.

Another arrangement provides a computer system for moderating content, comprising: a moderator module configured to enable output to a human moderator of pieces of content to be moderated, the moderator module including modification means operable to suggest modification of a piece of content which causes a breach of at least one rule against which the human moderator is assessing the content, wherein applying the suggested modification makes the assessed piece of content compliant with the at least one rule.

This moderator module is useful in the context of assessing content where a moderator has to manually assess all content, and also in the context of a computer system for analysing content as defined and described herein, where a detection module analyses pieces of content against a set of compliance rules and generates an alert so that the number of pieces of content requires to be assessed by a human moderator is limited.

BRIEF DESCRIPTION OF THE FIGURES

For a better understanding of the present invention and to show how the same may be carried into effect, reference is made to the accompanying drawings in which:

FIG. 2 illustrates an exemplary compliance rule set; and

DESCRIPTION OF PREFERRED EMBODIMENTS

Figure 1:
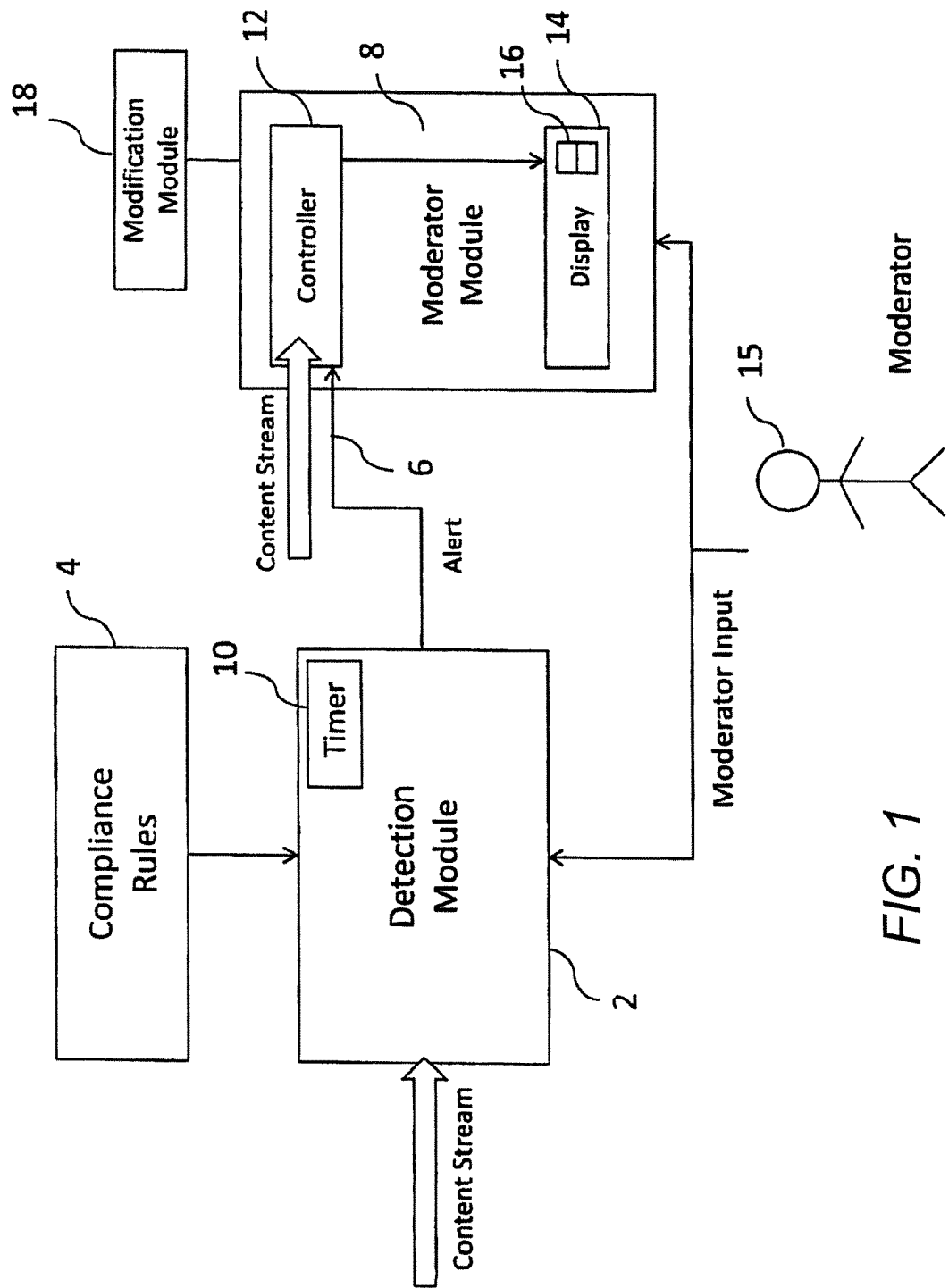
FIG. 1 illustrates a schematic block diagram of a system in accordance with an embodiment of the invention.

FIG. 1 is a schematic block diagram of an automated compliance management system for media assets, for example, video on demand (VOD) assets. The automated compliance management system uses an automated approach to a moderator process which analyses content and provides alert of potentially dubious content to a moderator who can then review the suspected snippet of content and then either approve or disapprove the content. The system comprises a detection module 2 which receives a content stream. The content stream can be a continuous broadcast stream or individual VOD assets. The detection module 2 uses cognitive analysis to apply a set of compliance rules and to automatically note when the rules have been breached. The compliance rules can be held for example in a local storage or memory 4, either within the detection module itself, outside the detection module or even remotely accessible by the detection module.

In the described example, the detection module comprises a processor which executes code implementing the cognitive analysis. In alternatives, the processor which execute an analysis code may be provided distinct from the detection module. The analysis processor is provided in a module that is separate to the detection module, and the detection module is configured to receive the results on the analysis data from the analysis processor.

One provider of suitable cognitive analysis algorithms is Irvine sensors, for example, Irvine sensors provide a solution called Alert™ which exploits high performance cognitive inspired processing techniques that accurately emulate how the human visual path interprets imagery. The system applies cognitive processing concept at a first stage (the edge) to identify regions of interest (ROI) in the data stream. In a second stage (the core) in depth cognitive analysis techniques are applied to the ROI's exploiting motion, spatial and colour content of high definition imagery.

The system is initialised with a cognitive based rule set that is continuously evolved during operations by utilising the techniques of unsupervised learning.

An example compliance rule set which is utilised by the BBC is shown in FIG. 2. It can be understood that there may be more than one set of compliance rules. The asset metadata may provide an indication of one or more compliance rule sets that should be utilised. For example the metadata may indicate the age category of the content, and the compliance rule set is retried according to the identified age category. A different set of compliance rules is used depending on the age category of the content.

These rules relate to a UK context, which is focused on matters such as swearing, sex, and violence, and the ratings described are English. Compliance could also be related to complying with a country's broadcast specifications— closed captioning in the U.S. for example. Ratings systems are different for each country, and what is offensive varies by country. By making the system rules based, it can accommodate that. Furthermore, the rules may be language specific, e.g. no "Bhenchod" in Bollywood flicks.

When the detection module 2 notes a breach of one of the compliance rules, it raises an alert 6 and supplies the alert to an external system in the form of a moderator module 8. This can be done via an application programming interface (API). The alert can contain information about the snippet of content which caused the alert to be raised. For example, the alert can contain a video identifier, an event time stamp and/or a compliance category. A video identifier identifies uniquely the piece of content which caused the alert to be raised. The event time stamp notes the time at which the alert was raised, and can identify the point in time within the piece of content that the uncompliant subject matter was noted. A detection module comprises a timer 10 for the purpose of supplying event time stamps.

When an alert 6 is raised, the suspect content is caused to be entered into a moderator's activity task to allow that particular snippet to be viewed.

To achieve this, the moderator module 8 comprises a controller 12 which is responsive to alerts 6, and which receives the content stream. The moderator module additionally has a display 14 which is controlled by the controller 12.

In one embodiment, the content stream is received at the moderator module in its entirety, but it is not displayed to the moderator unless the moderator requests to view it. A moderator 15 may make this request based on a task list displayed on the display 14. Each task in the task list can identify a particular likely suspect piece of content which, when selected by the moderator (for example by clicking a mouse or any other input means), then that piece of content is rendered on the display 14 for the moderator to view.

In another embodiment, the entire content stream is not received at the moderator module 8. Instead, when an alert is raised by the detection module only the snippet of content that caused the alert is passed to the moderator module with the alert ready for display to the moderator when the moderator selects the appropriate task from the task list 16.

It will be apparent from the above that the alert 6 includes sufficient information to cause a task to be generated in the task list and made visible to the moderator 15 on the display 14. Thus, the controller 12 executes in a processor a computer program which is responsive to alerts and is capable of extracting information from an alert in order to generate and render on the display 14 a task.

Selections from a task list may be made in any suitable way by the moderator, by way of mouse, touch screen, voice input, etc. When a task is selected, it automatically accesses the piece of content that gave rise to the task and displays it to the moderator 15.

The system in FIG. 1 has been described in the context of video assets. However, the same technique can be utilised to automate the detection of audio compliance rules and to create an alert which allows a moderator to select audio clips to be listened to.

The moderator module 8 can comprise a modification module 18. This module can form part of the moderator module 8 itself or be accessed by the moderator module 8. It is implemented by a computer program executable by a processor, which could be a processor within the moderator module or a separate processor in the modification module. The function of the modification module is to provide suggestions or mechanisms to modify pieces of content which have been identified as breaching a certain rule and which show up on the alert list. For example, a movie could show a scene with strong language like "f**k". In that case, the modification module 18 would react to that and cause a suggestion to be displayed on the display 14 to the moderator. For example, the suggestion could be that the moderator beep out the strong language. Thus, the moderator would be able to supply input responsive to the suggestion so as to modify the scene in a way as to render it compliant with the rules. In addition to a beep-out of strong language, pixelling of portions of certain scenes or cutting scenes that show violence are possibilities that would allow the moderator to modify the scene or piece of content based on the alert and the suggestions. The moderator does not have to follow the suggestions—he could apply a manual modification by way of moderator input when he receives an alert.

Figure 3:
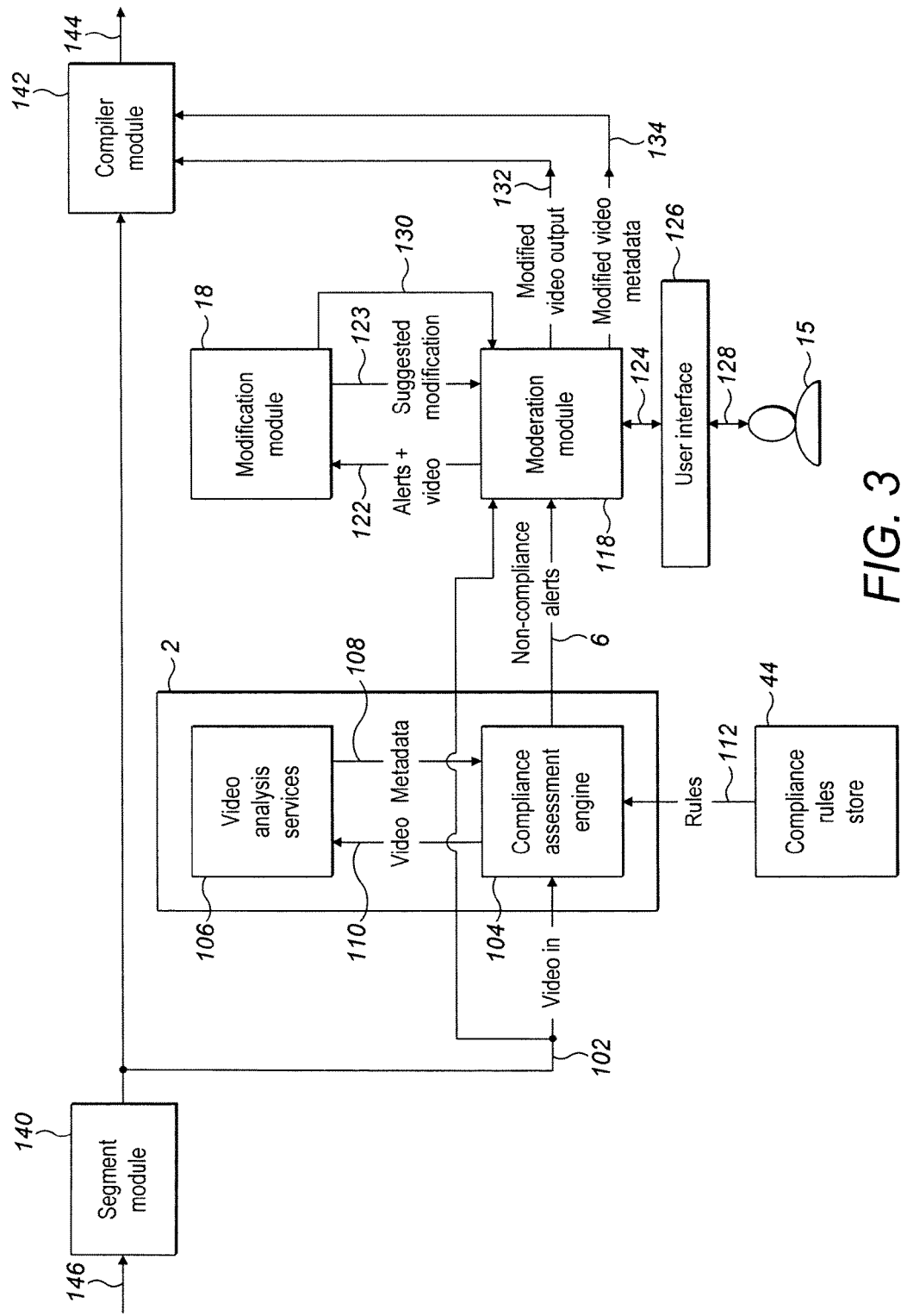
FIG. 3 illustrates a schematic block diagram of a system in accordance with an embodiment of the invention.

A further explanation is now provided with reference to FIG. 3. FIG. 3 corresponds to FIG. 1, and where elements of FIG. 3 are the same as elements of FIG. 1 like reference numerals are used.

In the following example, a piece of digital content is assumed to be a piece of video content, but the invention is not limited to video content.

The detection module 2 of FIG. 3 comprises a video analysis services module 106 and a compliance assessment engine 104. A compliance rules store 114 is provided, corresponding to the compliance rules 4 of FIG. 1, which is provided as an external store of compliance rules. The video analysis services in block 106 may be provided external to the detection module 2, in a block which is accessible by the compliance assessment engine 104.

A piece of video content is received on communication lines 102 by the compliance assessment engine 104. The piece of video content is associated with asset metadata. This asset metadata describes the piece of content, and might be used for example in a VoD (video on demand) library to describe the piece of video content to a user. The asset metadata may comprise: title; description; content rating; etc. . . . . This asset metadata is received by the compliance assessment engine 104 along with the piece of video content itself.

The compliance assessment engine 104 provides on communication lines 110 a copy of the received piece of video content to a block 106 which contains one or more video analysis services. This may be the provision of a copy, or may be a connection of the communication lines 102 to the video analysis services 106 under the control of the compliance assessment engine 104. The video analysis services are one or more analysis services each of which provides analysis metadata for a given piece of digital content. The analysis metadata will depend on the analysis of the piece of digital content which the particular analysis service performs. Examples of an analysis service include: speech-to-text conversion; Irvine Alert Sensors that provide a cognitive analysis of the media; etc. . . . .

Regardless of the analysis performed, the video analysis services return analysis metadata for the piece of digital content on communication lines 108. The analysis metadata describes the content of the piece of digital content in a format that can be used to compare it with the compliance rules.

Preferably one analysis is carried out, and therefore one set of analysis metadata is provided for the piece of digital content. However more than one analysis may be carried out, and thus more than one set of analysis metadata for the piece of digital content may be provided.

The video analysis service is configured to provide the analysis metadata in a format which allows a comparison operation, as discussed further below, to be carried out.

The compliance assessment engine 104 receives the analysis metadata on communication lines 108, and additionally receives on communication lines 112 rules from a compliance rules store 114.

The compliance rules store 114 may store rules in different formats, the different formats corresponding to the formats of the video analysis services in block 104. As such the rules may be provided to the compliance assessment engine 104 in an appropriate form based on the analysis which has been conducted.

The compliance assessment engine 104 carries out a comparison of the analysis metadata with the compliance rules. This comparison determines whether the analysed piece of digital content is associated with any breach of the rules.

In dependence on the comparison, the compliance assessment engine 104 generates non-compliance alerts on communication lines 6, as described also with reference to FIG. 1. When a piece of content fails to meet one or more compliance rules, an alert is created. An alert is created for each breach that describes a non-compliance. No alert is generated if there is no breach of the rules.

An alert comprises alert metadata, describing the alert. Each alert metadata preferably includes a reference to the asset (i.e. the piece of digital content), a reference to the part of the asset that breaks a rule, a reference to the rule, and some additional information about why that part of the asset broke the rule.

For example, an alert metadata may comprise:
Reference to the Asset: 636HF825.
Reference to the part of the asset: 00:21:43->00:21:49.
Reference to the rule: Inappropriate Language.
Additional Information: "f***" heard in sound track).

This provides a unique identifier which uniquely identifies the asset, a time stamp indicating the time within the asset at which the rules breech has been identified, the nature of the rule breech, and then the specifics that gave rise to the identification of the rule breech.

Also shown in FIG. 3 are a moderation module 118 which is an example implementation of the moderator module 8 of FIG. 1, and the modification module 18 of FIG. 1.

Any non-compliance alerts on communication lines 116 are received by the moderation module 118.

The moderation module 118 preferably forwards the alert metadata to the modification module 18 on communication lines 122. The moderation module 118 preferably forwards the alert metadata together with the piece of digital content (e.g. a piece of video content) to the modification module 120. In this example the moderation module 118 receives the alert metadata from the compliance assessment engine, and also receives the piece of digital content on communication lines 102, and forwards them both to the modification module 120. However the modification module may receive the piece of digital content directly from communication lines 102 itself, or from some other source.

The modification module 18 receives the alert metadata from the moderation module 118 to determine if a suitable modification is possible, such as a bleeping out of some audio, suggesting a cut etc. . . . . In this way, a modification can be determined in an automated way. The modification module 18 may provide a recommendation for an edit, and/or may apply an edit to the piece of digital content.

Where the modification module 18 has access to the piece of digital content, it may edit this piece of digital content. As shown by line 130, the modification module 120 thus may provide a modified piece of digital content to the moderation module 118. The modified video content may then be provided to a manual operator for approval.

Alternatively, the modification module 18 may describe the action(s) that a manual editor is recommended to take. This suggestion is contained in modification option metadata provided on communication lines 123 to the moderation module 118.

Where modification option metadata is received by the moderation module 118 the moderation module 118 is configured to control a user interface 126 to communicate with a manual moderator, for example the moderator 15 of FIG. 1. Communication lines 124 represent be-directional communication between the moderation module 118 and the user interface 126 associated with the moderator 15.

The user interface 126 may be any suitable interface for displaying information to the moderator and receiving inputs from the moderator such as those typically associated with video editing activities. This may be an interactive display including the display of FIG. 1. Interactions between the moderator and the user interface are illustrated in FIG. 2 by bi-directional communication 128.

The moderation module 118 may cause the display of a suggestion corresponding to the modification option metadata to the moderator 15. This display may comprise displaying a description of the modification, and/or displaying the piece of digital content with and/or without the modification made thereto.

The manual moderator can then decide if they want to accept the modification (in which case the piece of digital content is changed), reject it or amend/adapt the modification before it is committed. Any action by the manual moderator 15 is captured by the user interface 126 and communicated to the moderation module on communication lines 124.

When a recommended modification is accepted, an appropriate edit is made to the piece of digital content and then the modified piece of digital content is provided on communication lines 132.

Where the modification module 18 provides a modified piece of content (e.g. video) on line 130 which is accepted by the moderator, then this is output on line 132. If the moderator provides or confirms the edit to made to the piece of digital content, then this edit/modification can be made to the piece of video content by the moderation module 118, or by the modification module 18 under the control of the moderation module 118.

When a recommended modification is rejected, then the unmodified piece of digital content is provided on communication lines 132.

When a recommended modification is amended/adapted, an appropriate edit is made to the piece of digital content and then the modified piece of digital content is provided on communication lines 132.

When the modification module 118 provides an edited piece of digital content on communication lines 130, and this is provided to the manual moderator for approval, a similar procedure for the manual operator to decide if they want to accept the modification, reject it or amend/adapt the modification before it is committed, is followed.

Following any modification there is generated a modified piece of digital content. This is provided on communication lines 130. If no modification is made after the process, because of rejection of a change, then the original piece of digital content may be output on communication lines 132.

In addition, as a result of any modification, there is provided a modified asset metadata on communication lines 134. The asset metadata may be modified, for example, to reflect the modification which has been made to the piece of digital content. For example, a modification to the metadata may be that the content should not be shown before the watershed—i.e. restricted to a particular time of day. Where the piece of digital content has not been modified, then no modified asset metadata is required, and the original asset metadata may be provided on communication lines 134.

The original asset metadata may be provided to the moderation module 118 via its receipt of the piece of digital content on communication lines 102.

It will be apparent from this description that the modification as a result of the alert may be a modification to the piece of digital content, or a modification to the asset metadata of the piece of digital content, or both. For example, where an expletive is identified in a piece of digital content, it may not be edited but instead the metadata may be edited to restrict the time as which the piece of digital content may be shown. Alternatively the content may be edited, and also because of its presence (even edited) the metadata may be edited to also restrict the time it may be shown.

In the example the modification module recommends a modification. However in other examples the moderation module may simply provide the operator with an indication of the content and the rule breach, but no recommended modification. Any modification is then provided by the moderator.

As is further shown in FIG. 3, the pieces of digital content on communications lines 102 are provided from a module 140. The module 140 receives as an input a digital data stream on line 146, and generates the pieces of digital content from that data stream. The module 140 may divide the data stream on line 146 into segments so that pieces of digital content, or segments of digital content, are provided on line 102 for processing. As such the module 140 may be referred to as a segment generator.

Also shown in FIG. 3 is a module 142 which receives the pieces of digital content on line 102, and also receives the modified piece of digital content on line 132 and its associated modified asset metadata on line 134. The module replaces each piece of digital content on line 102 with a modified piece of digital content, if the piece has been modified. Otherwise the piece is unmodified. The pieces are then reassembled by the module 142 and a moderated data stream is then generated on line 144 at the output of the module 142. The module 142 may be termed a compiler module.

The response of the moderator to compliant or non-compliant material can be as known in the art. That is, he can reject the material or tag it or mark it in some way appropriate to the aim of the compliance system. Any approaches which are known in the context of manual moderation can be utilised by the moderator in this novel automated system.

Whatever steps a moderator takes responsive to his review of suspect content can be input into the detection module, either via the moderator module and the API, or into the detection module itself. This thus provides feedback to the cognitive analysis algorithm and improves the further detection in an automated way of possibly suspect pieces of content.

The modification module is particularly useful in the context of a moderator module which receives alerts as described herein. However, it is also applicable in the context of a moderator module where all content is required to be assessed by the moderator.

When content is flagged to a moderator (for example, exposure of inappropriate flesh in a movie for the Middle East), the workflow may also include flagging to an editor who would be responsible for editing the scene as opposed to the moderator making these changes.

The detection module can be configured to create time stamped compliance metadata for a piece of VOD content that could then be used by either the moderator or imported into a Media Asset Management System that would associate the compliance metadata with an asset. A potential use case is that one may detect compliance issues in a piece of VOD content and not necessarily make any modifications to the content, but may increase the parental rating from a 15 to an 18 for example.

The invention may be implemented in an apparatus, a method, or computer program code.

The apparatus may be a user device, or a server to which a user device is connected, or a system comprising a user device and a server. Each apparatus may include, at least, a processor and a memory and generally be implemented in a user device, or a server to which a user device is connected, or both a user device and a server.

The method may be a computer program. A computer program may be a computer program or executable code which, when run or executed on an apparatus, performs the method. The computer program or executable code may be run on the user device, or the server, or both the user device and the server.

The computer program may be stored on a memory, and may be stored across multiple memories. The memory may be a memory of a functional device, or may be a specific memory storage apparatus such as a memory disk or memory stick. The memory may be a memory available on a network, such as a memory area available in a network such as an area of a so-called 'cloud'.

Aspects of the inventions described herein include any or all of the described features used in any combination.

The invention claimed is:

1. A server device for analyzing content, comprising:
   a detection module connected to receive a digital data stream comprising a plurality of pieces of digital content, each piece of digital content being associated with asset metadata describing the piece of digital content, the detection module being operable to access a set of compliance rules and compare each piece of digital content with the set of compliance rules, the detection module further being configured to generate an alert if a result of the analysis indicates a breach of at least one of the rules by a piece of digital content;
   a moderator module connected to receive the alert, the moderator module configured to output to a moderator only the piece of digital content which caused the alert to be generated, whereby the moderator can assess the piece of digital content which caused the alert to be generated, wherein the piece of digital content is selectively modified;
   a modification module for modifying the asset metadata associated with the piece of digital content for which the alert was generated, whether or not the piece of digital content is modified itself, based on the comparison which caused one or both of the alert and the modified piece of digital content; and
   a compiler module for compiling and outputting to a plurality of end users a digital data stream comprising:
      any piece of digital content for which no alert was generated and its respective unmodified asset metadata describing that unmodified piece of content;
      any piece of digital content for which an alert was generated and which was not modified, and its respective modified asset metadata describing that piece of unmodified content; and
      any piece of digital content for which an alert was generated and which was modified, and its respective modified asset metadata describing that piece of modified content.

2. The server device of claim 1 wherein the detection module is configured to analyze the at least one piece of digital content, and compare a result of the analysis with the set of compliance rules.

3. The server device of claim 2 wherein the detection module is configured to generate analysis metadata in dependence on the analysis, and compare the analysis metadata with the set of compliance rules, wherein the analysis metadata describes the piece of digital content in a format that can be compared with the compliance rules.

4. The server device of claim 1 wherein the alert comprises alert metadata describing the piece of digital content, wherein the alert metadata comprises one or more of: a reference to the piece of digital content; a reference to a part of an asset that breaks at least one of the rules; a reference to the broken rule; and additional information about why that part of the asset broke the rule.

5. The server device of claim 4 wherein a modification to the piece of digital content is suggested based on the alert metadata, wherein the suggested modification is presented on a user interface to the moderator for approval, the modified piece of digital content is presented on the user interface, and a description of the modification to the piece of digital content is presented on the user interface.

6. The server device of claim 1 wherein the moderator can assess a recommended modification to be made to the piece of digital content, and the moderator can accept, reject or adapt the recommended modification.

7. The server device of claim 1 wherein the modification module additionally modifies the piece of digital content.

8. The server device of claim 7, wherein the metadata is modified in accordance with the modified piece of digital content.

9. The server device of claim 1 wherein the modification module modifies the metadata without modifying the piece of digital content.

10. The server device of claim 1 wherein the asset metadata describing the piece of digital content comprises at least one of: title; description; content rating; and parental rating.

11. The server device of claim 1 wherein when the metadata is modified, it is modified to at least one of: restrict the time at which the piece of digital content may be shown; and increase the parental rating associated with the piece of digital content.

12. A method for analyzing content in a server device, comprising:
   receiving a digital data stream comprising a plurality of pieces of digital content, each piece of digital content being associated with asset metadata describing the piece of digital content;
   accessing a set of compliance rules;
   comparing each received piece of digital content with the accessed compliance rules;
   generating an alert if a result of the comparing step indicates a breach of at least one of the rules;
   outputting to a moderator, responsive to the alert, an identification associated with only the piece of digital content which caused the alert to be generated;
   selecting for assessment the piece of digital content which caused the alert to be generated, wherein the piece of digital content is selectively modified;
   modifying metadata associated with the piece of digital content whether or not the piece of digital content is modified itself, based on one or both of the comparison which caused the alert and the modified piece of digital content; and compiling a digital data stream comprising:
- any piece of digital content for which no alert was generated and its respective unmodified asset metadata describing that piece of unmodified content;
- any piece of digital content for which an alert was generated and which was not modified and its respective modified metadata describing that piece of unmodified content;
- any piece of digital content for which an alert was generated and was modified and its respective modified metadata describing that piece of modified content; and
- outputting the compiled digital data stream to a plurality of end users.

13. The method of claim 12 wherein the comparing step comprises:
- analyzing the piece of digital content; and
- comparing a result of the analysis with the set of compliance rules.

14. The method of claim 13 wherein the step of analyzing the piece of digital content comprises generating analysis metadata describing the piece of digital content, wherein the analysis metadata is used for the comparing the result of the analysis step.

15. The method of claim 12 wherein the step of generating the alert comprises creating alert metadata, and including the alert metadata in the alert, wherein the alert metadata describes the breach of at least one of the rules.

16. The method of claim 12 further comprising suggesting a modification to the piece of digital content based on the metadata, and presenting the modification on a user interface to the moderator for approval.

17. The method of claim 12 wherein at least one of: a modified piece of digital content is presented on a user interface; a description of a modification proposed to be made to the piece of digital content is presented on the user interface; and the original piece of digital content is displayed on the user interface.

18. The method of claim 12 further comprising the step of modifying the piece of digital content.

19. The method of claim 12 wherein the step of modifying the metadata is performed without a step of modifying the piece of digital content.

20. A non-transitory computer program product for storing computer program code which, when executed on a computer, performs an analysis of content in a server device comprising the steps of:
- receiving a digital data stream comprising a plurality of pieces of digital content, each piece of digital content being associated with asset metadata describing the piece of digital content;
- accessing a set of compliance rules;
- comparing each received at least one piece of digital content with the accessed compliance rules;
- generating an alert if the result of the comparing step indicates a breach of at least one of the rules;
- outputting to a moderator, responsive to the alert, an identification associated with only the piece of digital content which caused the alert to be generated;
- selecting for assessment the piece of digital content which caused the alert to be generated, wherein the piece of digital content is selectively modified;
- modifying metadata associated with the piece of digital content whether or not the piece of digital content is modified itself, based on one or both of the comparison which caused the alert and the modified piece of digital content; and
- compiling a digital data stream comprising:
  - any piece of digital content for which no alert was generated and its respective unmodified asset metadata describing that piece of unmodified content;
  - any piece of digital content for which an alert was generated and which was not modified and its respective modified metadata describing that piece of unmodified content;
  - any piece of digital content for which an alert was generated and was modified and its respective modified metadata describing that piece of modified content; and
  - outputting the compiled digital data stream to a plurality of end users.

* * * * *